United States Patent [19]

Kurzweg

[11] Patent Number: 4,590,993
[45] Date of Patent: May 27, 1986

[54] HEAT TRANSFER DEVICE FOR THE TRANSPORT OF LARGE CONDUCTION FLUX WITHOUT NET MASS TRANSFER

[75] Inventor: Ulrich H. Kurzweg, Gainesville, Fla.

[73] Assignee: University of Florida, Gainesville, Fla.

[21] Appl. No.: 664,048

[22] Filed: Oct. 23, 1984

[51] Int. Cl.[4] .............................................. F28D 15/00
[52] U.S. Cl. ................................ 165/104.31; 165/10; 165/104.34
[58] Field of Search ............ 165/4, 10, 104.31, 104.34

[56] References Cited

U.S. PATENT DOCUMENTS

| 2,787,444 | 4/1957 | Sbarstrom | 165/84 |
| 4,098,324 | 7/1978 | Kummel et al. | 165/1 |
| 4,135,371 | 1/1979 | Kesselring et al. | 62/477 |

FOREIGN PATENT DOCUMENTS

| 187553 | 12/1905 | Fed. Rep. of Germany | 165/104.31 |
| 420204 | 10/1925 | Fed. Rep. of Germany | |
| 1033223 | 7/1958 | Fed. Rep. of Germany | 165/104.31 |

OTHER PUBLICATIONS

U. K. Kurzweg, "Enhanced Heat Conduction in Fluids Subjected to Sinusoidal Oscillations", submitted for publication to *Journal of Heat Transfer* (ASME).
U. K. Kurzweg and Ling-de Zhao, "Heat Transfer by High Frequency Oscillations", A New Hydrodynamic Technique for Achieving Large Effective Thermal Conductivities", submitted for publication to *Physics of Fluids*.

Primary Examiner—Albert W. Davis, Jr.

[57] ABSTRACT

A device for the transport of large conduction heat flux between two locations of differing temperature includes a pair of fluid reservoirs for positioning at the respective locations connected by at least one duct, and preferably a plurality of ducts, having walls of a material which conducts heat. A heat transfer fluid, preferably a liquid, and preferably a liquid metal such as mercury, lithium or sodium, fills both reservoirs and the connecting ducts. An oscillatory axial movement or flow of working fluid is established within the ducts, with the extent of fluid movement being less than the duct length. Preferably the oscillatory movement is sinusoidal. Heat is transferred radially between the fluid and the duct walls and thence axially along the ducts. The rate of heat transfer is greatly enhanced by a physical mechanism which may be described as a high time-dependent radial temperature gradient produced by fluid oscillations. During most of each sinusoidal cycle, fluid in the wall-near region has a temperature different from the core of the fluid column, with most of the temperature difference concentrated across a relatively thin boundary layer.

26 Claims, 4 Drawing Figures

HEAT TRANSFER DEVICE FOR THE TRANSPORT OF LARGE CONDUCTION FLUX WITHOUT NET MASS TRANSFER

BACKGROUND OF THE INVENTION

The present invention relates to a device for very large conduction heat transfers without a concomitant mass transfer. The present invention can be employed in any situation where a heat pipe might otherwise be employed, but the present invention is superior to a heat pipe in several respects. The invention has particular utility in the rapid removal of heat from fluids which are radioactive (such as in nuclear reactors), as well as from fluids having undesirable chemical properties and which must remain isolated from the environment.

Although the present invention is quite distinct from a heat pipe, heat pipes nevertheless provide a convenient reference point for purposes of comparison. As is well known, in principle a heat pipe is an elongated cylinder containing a working fluid which changes between the liquid and the gas phases during operation. The heat pipe absorbs heat at one end by vaporization of working fluid, and releases heat at the other end by condensation of the resultant vapor. The liquid condensate returns to the heat absorbing end by capillarity through a capillary structure, for example covering the internal face of the cylinder. The process proceeds continuously, and the resultant heat transfer of a heat pipe may be 10,000 times or more higher than the conductive heat transfer of a solid copper or silver rod.

While heat pipes have found wide application, they nevertheless have two disadvantages in particular which are overcome by the present invention. One disadvantage of heat pipes is that the working fluid within the heat pipe continuously recirculates during operation from one end to the other. Thus there is mass transfer from one end to the other. This is particularly disadvantageous in the case of heat removal from radioactive fluids because radioactivity is in effect carried from one end of the heat pipe to the other as the entire volume of working fluid becomes radioactive. A second disadvantage of heat pipes is that a given heat pipe, depending upon the particular working fluid selected and the internal pressure, can function only over a particular range of temperatures. Specifically, the temperature at the heat-absorbing (relatively hotter) end of the heat pipe must be at least high enough for vaporization of liquid phase working fluid, and the temperature at the heat-releasing (relatively colder) end of the pipe must be at least low enough for condensation of gas phase working fluid.

In addition to avoiding these two disadvantages, the present invention provides much higher heat transport rates. Embodiments of the present invention can provide heat transport rates several orders of magnitude greater than that of existing heat pipes.

SUMMARY OF THE INVENTION

Accordingly, it is an object of the invention to provide structures for the transport of large conduction heat flux.

It is another object of the invention to provide such devices which operate without net mass transfer.

It is another object of the invention to provide such devices which avoid the working temperature limitations of heat pipes which follow from the temperature needed for liquid vaporization and the temperature needed for condensation.

Briefly, a heat transfer device in accordance with the invention includes a pair of fluid reservoirs adapted for positioning at respective locations of differing temperatures between which it is desired to transfer heat. At least one duct having walls of a material which conducts heat connects the fluid reservoirs. In typical embodiments, there are a plurality of such ducts connecting the fluid reservoirs. The plurality of ducts can have any one of a variety of particular configurations. One configuration example is a bundle of metallic tubes supported within an overall outer tube, preferably thermally insulated. In this particular configuration, ducts are defined in two general regions: within the tubes, as well as in the approximately triangular interstitial spaces defined between the outer walls of adjacent tubes. As another configuration example, a six-sided elongated honeycomb structure or similar three- or four-sided structure may be provided.

A quantity of heat transfer fluid, preferably liquid, fills the ducts and reservoirs. Preferably there are no void spaces within the system and thus the reservoirs are completely filled. For maximum heat transfer, a liquid metal is employed as the heat transfer fluid, such as mercury, liquid lithium or liquid sodium.

Greatly enhanced heat transfer between the two fluid reservoirs is effected by providing a means for establishing an oscillatory axial movement or flow of working fluid within the ducts, with the extent of fluid movement being less than the duct length. Preferably the oscillatory movement is sinusoidal.

In the disclosed embodiments, the oscillatory axial movement is established by an oscillatory displacement device acting on fluid within one of the reservoirs. Two examples of suitable oscillatory displacement devices are a piston acting within a suitable cylinder either comprising a part of the one reservoir or connected directed to the one reservoir, and a flexible diaphragm comprising a wall of the one reservoir and acted on by an external shaking device. Whatever the specific form, the oscillatory displacement device functions to alternately displace fluid within the one reservoir such that working fluid is caused to move axially in one direction through the ducts, and then to in effect draw heat transfer fluid back into the one reservoir such that heat transfer fluid moves in the opposite direction within the ducts. Thus, within the ducts, fluid oscillates in alternate axial directions at a predetermined frequency and with a predetermined tidal displacement or amplitude.

As noted above, the extent of fluid movement within the tubes is less than the length of the tubes such that there is no net transfer of heat exchange fluid from one of the reservoirs to the other. While some migration may occur slowly by diffusion, such mass transfer by diffusion is not great, particularly where the heat transfer fluid is a liquid metal such as mercury, or even liquid lithium or liquid sodium at higher temperatures. In any event, the operation of the invention requires only an oscillatory movement, and thus operation of the invention requires no net mass transfer whatsoever.

Since the preferred liquid heat transfer fluid is substantially incompressible, a displacement accommodating device is provided at the other one of the reservoirs acted on by fluid therewithin. A suitable displacement accommodating device can comprise a similar, although passive piston, preferably with resilient biasing elements such that energy is returned to the driving piston on the return stroke of the driving piston. As another example, the displacement accommodating device can comprise a simple diaphragm or membrane comprising one of the walls of the other reservoir, preferably backed by a gas-filled sealed chamber.

With this arrangement, large quantities of heat are transported axially along the ducts, provided the fluid is oscillated at sufficiently high frequency and with a sufficiently large tidal displacement. As is described next below, the heat transfer mechanism is a highly enhanced heat conduction process involving symmetrical oscillatory heat transfer between the heat transfer fluid and the walls of the ducts. The operation is explained below first in overview, and then with a more detailed explanation of the mechanism by which highly enhanced heat transfer occurs. Finally, a detailed mathematical analysis is included as an Appendix at the end of this specification.

For purposes of explanation, it will be assumed that heat is being transferred from the relatively hotter reservoir which includes an oscillatory displacement device in the form of a piston, to the relatively colder reservoir. An exemplary cycle begins with the piston moving on its forward stroke to displace heat transfer fluid from within the hotter reservoir such that fluid moves within the ducts in the direction from the hotter towards the relatively cooler reservoir. During the forward stroke, hot regions of the fluid moving into contact with duct walls which are relatively cooler. Thus, the hot fluid regions transfer heat into the walls of the duct, portions of which consequently increase in temperature. On the return stroke, heat transfer fluid is drawn in the opposite direction through the ducts. During the return stroke, relatively cooler regions of heat transfer fluid move into contact with the just-heated wall portions, and heat thus flows from these wall portions to the fluid regions.

This action continues in oscillatory manner and, once operation gets underway, heat is effectively transferred in increments, the spacing between which is determined by the tidal displacement of heat exchange fluid within the ducts. At particular instants during operation, there exist localized alternating relatively hotter and relatively colder duct wall portions, and localized relatively hotter and relatively colder fluid regions in motion relative to the wall portions.

These hot and cold fluid regions which are set up effectively interface each other through portions of the wall to and from which heat is transferred in a symmetrical manner and which briefly store heat. Significantly these hot and cold regions of the fluid which are set up effectively interface each other over a much larger area than the duct cross-section.

Since the extent of fluid movement, i.e. the tidal displacement, is less than the length of the ducts and since the movement is strictly oscillatory, there is no net mass transfer during operation. Moreover, during this overall cycle, heat enters the wall, but then is given up on the next part of the cycle. Thus, by symmetry, there is essentially no net heat transfer through the walls.

While the foregoing provides an overview, it does not fully explain the high rate of heat transfer achievable with the subject invention. Such an explanation will now be provided.

In general, rate of heat transfer is proportional to the product of three factors: Thermal conductivity, the area over which heat transfer occurs, and temperature gradient (temperature difference per unit distance). Applying this general relationship to the structures of the invention, the thermal conductivity is that of the tube walls and the heat transfer fluid. Thus, the thermal conductivity factor is subject to predictable contraints. As mentioned above, to maximize heat transfer, liquid metals are preferred as the heat transfer fluid. The area over which heat transfer takes place in this relationship is the area within the ducts over which the duct walls and the heat transfer fluid interface. The area factor is also subject to predictable constraints.

The third factor, temperature gradient, is another matter, not subject to constraints which are obvious. More particularly, in accordance with one aspect of the invention, the temperature gradient factor is greatly increased beyond that which might be expected due to the formation of a boundary layer across which temperature differences are concentrated.

As is known, wherever a viscous fluid flows past a boundary, the layers of the fluid nearest the boundary are subjected to shearing forces, which cause the velocity of these layers to be reduced. As the boundary is approached, the velocity continuously decreases until, immediately at the boundary, the fluid particles are at rest relative to the body. This region of retarded velocity is called the boundary layer, and a graph of the variation of velocity with distance from the wall or boundary describes a boundary layer profile. The primary effects of the viscosity of the fluid are concentrated in this boundary layer, whereas in the outer or free-stream flow the viscous forces are negligible. Thus in a closed conduit or duct the free-stream flow occurs in a moving fluid column centered on the axis of the duct. The boundary layer may be viewed as a sheath around the moving column.

It will accordingly be appreciated that, in the situation of the present invention, such a boundary layer is created during each oscillatory movement of fluid within the ducts. An important consequence follows from the existence of this boundary layer.

In particular, with a sufficiently thermally-conductive heat transfer fluid and with an appropriate duct size, i.e. diameter, the temperature of the moving fluid column is constant, relatively speaking, from the center of the column up to the bondary layer. During most of each cycle, the heat transfer fluid in the portion of the boundary layer region immediately adjacent the duct wall has a temperature different from that of the fluid column within the duct. It is thus within the boundary layer that the temperature difference between the fluid column and the duct wall is concentrated. The thinner the boundary layer the greater will be the temperature gradient.

As a result, by selection of frequency and displacement (which together determine a velocity profile) the temperature gradient is made extremely high, and the radial heat transfer rate between the fluid and the walls of the duct is correspondingly very high. The physical mechanism resulting in enhanced heat transfer may be described as a high time-dependent radial temperature gradient produced by fluid oscillations. During most of each sinusoidal cycle the fluid in the wall-near region has a temperature different from the core of the fluid column. As a result, large quantities of heat are transported radially and hence axially.

While a detailed mathematical analysis will be found in the Appendix at the end of this specification, in general it can be stated that the effective thermal diffusivity is proportional to the square of the fluid displacement, the square root of the frequency, and inversely to the size, e.g. diameter, of the ducts. Optimum heat transfer occurs when the duct diameter is such that the time for thermal diffusion across the duct just equals one-half of the oscillation period. By way of specific example, using liquid sodium as a heat transfer fluid at an oscillation amplitude (tidal displacement) of 100 cm at a frequency of 30 Hz in metal tubes of 0.4 mm diameter each, an axial heat flux of $1.3 \times 10^{10}$ watts/m$^2$ can be achieved.

As another example, an experimental device was constructed employing merely water as the heat transfer fluid, and tubes (ducts) of glass. At an oscillation frequency of 8.0 Hz, with an axial fluid displacement, (i.e. amplitude) of 12.5 cm, the effective axial thermal conduction was measured to be 17,900 times that of the value predicted in the absence of oscillations. In other words, the water showed an effective thermal conductivity about 25 times better than an equivalent copper rod of equal cross section. A more detailed description of this experiment will also be found in the Appendix.

In any given case, there is an optimum size, i.e. diameter, of the ducts. (While the ducts are not necessarily circular in cross section, for purposes of analysis, it is simpler to consider them as so.) If the duct diameter is too small, then the boundary layer and the duct diameter become equal. When this occurs, there is no concentration of temperature difference to produce a large temperature gradient, and thus the enhanced conduction effect is lost. If the duct diameter is too large, then the heat transfer becomes less effective from the center of the moving fluid column to the boundary layer. With metal fluids, due to their relatively good thermal conductivities, diameters of 3.0 mm can be used, with frequencies within the approximate range of 2.0 to 50.0 Hz.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings in which:

DESCRIPTION OF PREFERRED EMBODIMENTS

Figure 1:
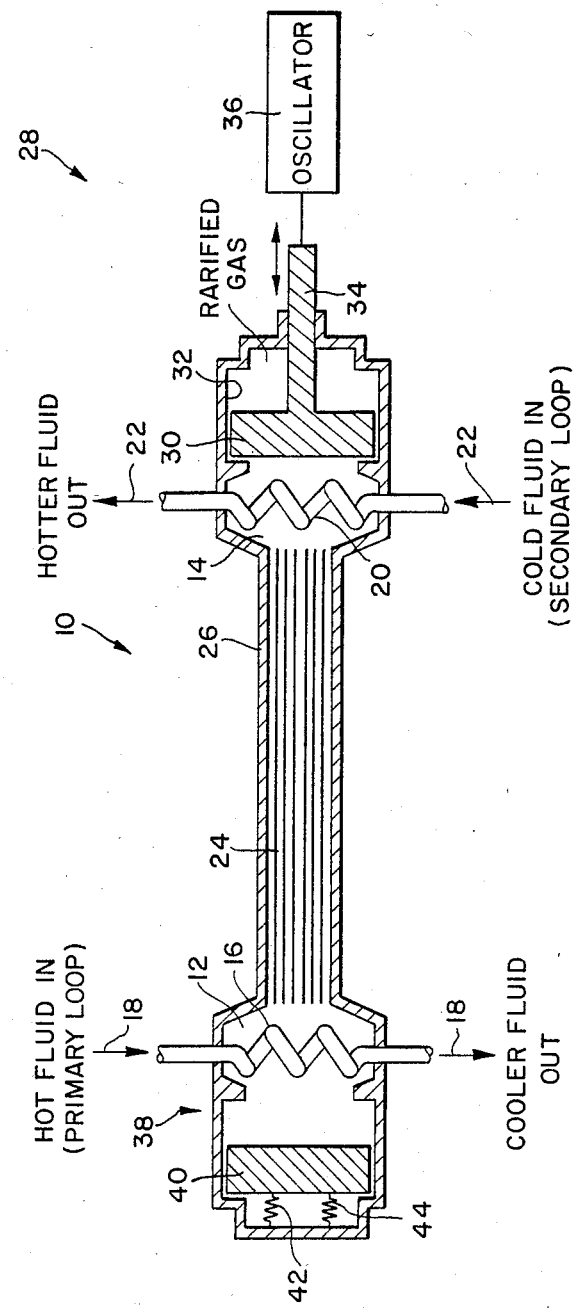
FIG. 1 is a cross-sectional view of one form of heat transfer device in accordance with the invention.

Referring first to FIG. 1, a heat transfer device 10 in accordance with the invention includes a pair of fluid reservoirs 12 and 14 adapted for positioning at respective locations of differing temperature between which it is desired to transfer heat. By way of example, the reservoir 12 is a relatively hotter reservoir and is positioned so as to remove heat from radioactive material (not shown). An exemplary heat exchanger 16 is provided within the reservoir 12, and radioactive primary loop fluid, represented by arrows 18, passes through the heat exchanger 16 and is cooled as heat is transferred to fluid within the reservoir 12.

The other fluid reservoir 14 is then the relatively cooler reservoir. A corresponding heat exchanger 20 is located within the reservoir 14, and secondary loop fluid represented by arrows 22 flows through the heat exchanger 20 so as to extract heat from the system.

The two reservoirs 12 and 14 are connected by at least one, and preferably a plurality, of ducts 24 having walls of a material which conducts heat. A quantity of heat transfer fluid fills the ducts 24 and at least portions, but preferably the entireties of the reservoirs 12 and 14. Optimally, the heat transfer fluid comprises a liquid metal, such as mercury, lithium or sodium, and the ducts 24 comprise a bundle of metal tubes, for example stainless steel, having a diameter in the order of 3 mm. The tube bundle is confined within an overall cylindrical casing 26 having a thermally-insulating wall.

Acting on fluid between one of the reservoirs 12 and 14, in this example within the reservoir 14, is an oscillatory displacement device 28. As a representative example, the oscillatory displacement device 28 comprises a driving piston 30 reciprocating within a cylindrical bore 32 in direct communication with the reservoir 14 and driven via a shaft 34 by an external mechanical oscillator 36. Typically, the driving piston 30 oscillates sinusoidally, but any suitable oscillation waveform may be employed.

Since the liquid heat transfer fluid is substantially incompressible, in order to keep the system entirely filled with fluid at all times with no voids, a displacement accommodating device, generally designated 38, is connected to the fluid reservoir 12. In the example shown, the displacement accommodating device comprises what may be viewed as a passive piston 40 resiliently supported by springs 42 and backed by a sealed chamber 44 of compressed gas. With this arrangement, as the piston 30 oscillates, it will be appreciated that heat transfer fluid moves alternately axially in opposite directions within the ducts 24. It will be appreciated that, by this arrangement, the passive piston 40, due to its resilient support, returns energy to the driving piston 30. As noted above, the oscillation amplitude is selected such that the extent of fluid movement within the ducts 24 is less than the length of the ducts.

In operation, as will be understood in light of the foregoing "Summary of the Invention", when the fluid within the ducts 24 is set into oscillatory axial movement, a time-dependent boundary layer is formed along the metal duct walls, and a large radial temperature gradient is established across this boundary layer. Hot and cold portions of the working fluid thus interface each other over a much larger area than the duct cross section, leading to a very large increase in radial and subsequent axial heat transport.

It is believed that the principles, operation, and exemplary embodiments of the invention will all be understood from the foregoing. Presented next in Appendix form are experimental results and a more rigorous mathematical analysis of enhanced conduction heat transfer via sinusoidal oscillatory flow through circular tubes connecting two fluid reservoirs maintained at different temperatures. This Appendix is based on two papers published subsequently to the filing date hereof: U. H. Kurzweg, "Enhanced Heat Conduction in Fluids Subjected to Sinusoidal Oscillations", *Journal of Heat Transfer* (ASME), Vol. 107, pages 459–462, May 1985; and U. H. Kurzweg and Ling-de Zhao, "Heat Transfer by High Frequency Oscillations; A new Hydrodynamic Technique for Achieving Large Effective Thermal Conductivities", in *Physics of Fluids*, American Institute of Physics, publisher, Vol. 27, No. 11, pages 2624–2627, November 1984. These papers are being published out of order in different publications, i.e., the Kurzweg paper logically preceeds the Kurzweg and Zhao paper.

APPENDIX

Experimental Setup

Figure 2:
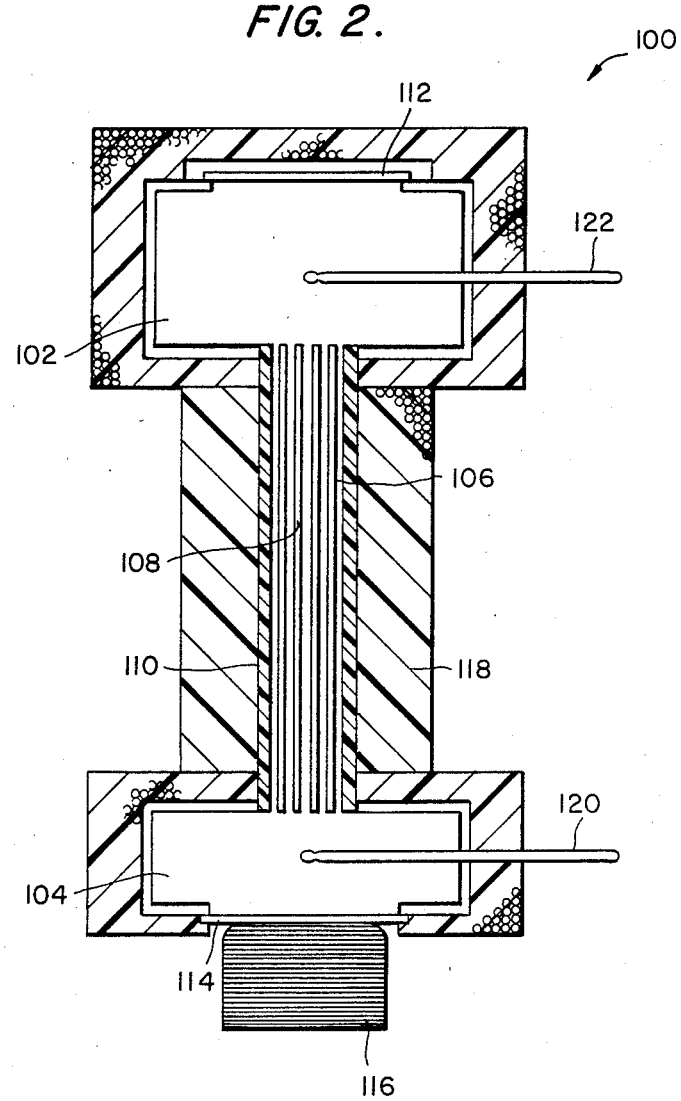
FIG. 2 is a similar cross-sectional view of an experimental device.

The experimental apparatus is shown schematically in FIG. 2 and generally designated 100. The heat transfer fluid employed is water. Two cylindrical fluid reservoirs 102 and 104 are connected to each other by a bundle 106 of thirty one closely packed glass capillary tubes 108 each having an inside diameter of 1.0 mm. The capillary tubes 106 are supported within a single acrylic tube 110 20.0 cm in length with an inside diameter of 1.27 cm. In this experimental apparatus, for convenience the cylindrical interior space of the capillary tubes and the approximately triangular interstitial spaces defined between adjacent capillary tubes 108 together comprise the ducts connecting the fluid reservoirs 102 and 104; there is no attempt such as by sealing to confine fluid to the more usual cylindrical interior space of the capillary tubes 108. The effective total cross sectional area of the connecting ducts (including the approximately trianqular effective cross sectional area of the capillaries including the triangular sections defined between adjacent capillary tubes) was determined by a water displacement method to be $A_o = 0.67$ cm².

The upper 102 (hot fluid) and lower 104 (cold fluid) reservoirs are equipped with flexible rubber membranes 112 and 114 so that the incompressible working fluid (water), which fills all the space within the connecting tubes and the reservoirs, can be made to oscillate by application of an external variable-frequency shaker 116. In order to minimize heat losses, the entire apparatus is encased within insulation 118.

The experiments were run by first filling the lower fluid reservoir 114 with dyed cold water (22° C.). Next clear hot water (78° C.) was used to fill the capillary tubes 108 and the interstitial spaces, as well as the upper reservoir 102, so that no air remained within the system. Temperatures within the upper and lower reservoirs 102 and 104 were monitored by means of thermometers 120 and 122. The fluid was put into oscillation by setting the external shaker 116 to a predetermined frequency and tidal displacement. The range of frequencies used was 2.0 Hz to 8.0 Hz, and the tidal displacements $\Delta z$ within the capillary tubes 108 ranged from 2.0 cm to 12.5 cm. The tidal displacements were determined by noting the maximum excursion of the dyed water from the lower reservoir 104 along the capillaries 108 during oscillation.

Experimental Results

For typical runs the temperature of the hot fluid $(T = T_h)$ in the upper reservoir 102 was observed to drop several degrees per minute while the cold fluid $(T = T_c)$ in the lower reservoir rose by several degrees per minute, with the most rapid temperature changes occurring at the start of oscillation. The temperature in both reservoirs 102 and 104 was monitored once a minute for a total of six minutes per run. From these observed temperature changes, and from the known lower reservoir volume of $V_c = 114$ cm³, the tube length of $L = 20$ cm, and the total fluid cross-sectional area $A_o = 0.67$ cm², the effective thermal diffusivity of the fluid was calculated employing the heat balance relation $$\kappa_e = V_c L \left( \frac{dT_c}{dt} \right) / A_o (T_h - T_c), \tag{1}$$

where $dT_c/dt$ is the time rate of change of temperature in the lower reservoir 104 and $(T_h - T_c)$ is the instantaneous temperature difference between reservoirs 102 and 104. The experimentally-determined values of $\kappa_e$ ranged from $\kappa_e = 1.4$ cm²/sec to $\kappa_e = 25$ cm²/sec. The highest of these values corresponds to an effective thermal diffusivity 17,800 times the molecular thermal diffusivity value of $\kappa = 1.4 \times 10^{-3}$ cm²/sec for water. As a comparison, the value of $\kappa$ for copper is 1.12 cm²/sec.

It was observed that the effective thermal diffusivity $\kappa$ is proportional to the square of the tidal displacement $\Delta_z$ and to the square root of the oscillation frequency f. This behavior is recorded in FIG. 3 where $\kappa_e$ is plotted as a function of the product of $(\Delta_z)^2$ and $\sqrt{\omega \nu}$.

A similar square root dependence has been found by Watson (E. J. Watson, *J. Fluid Mech.*, Vol. 133, p. 233, (1983)) in a related study on contaminent diffusion in the tubes under conditions where the square of the Womersley number multiplied by the fluid Schmidt number is large. The Womersley number is defined as $$\alpha = a \sqrt{\omega/\nu}, \tag{2}$$

where a is the tube radius, $\omega$ the angular frequency and $\nu$ the fluid kinematic viscosity. In the present heat transfer experiments the corresponding value of $\alpha^2 Pr$ is about 60, so that one is indeed in the same high frequency regime. $Pr = \nu/\kappa_f$ is the fluid Prandtl number. It should be pointed out that, for lower values of $\alpha^2 Pr$, the dependence of $\kappa_e$ will go as the first power of frequency, and as the square of the frequency at very low values of $\alpha^2 Pr$. The high frequency regime dealt with here offers several advantages in setting up an analytical model of the phenomenon in that the velocity profile for large can be well approximated by a constant velocity core with thin Stokes' boundary layers existing at the walls. Physically the high frequency regime corresponds to oscillation periods much shorter than the time required for heat to diffuse across the duct diameter.

The corresponding heat flow between the fluid reservoirs 102 and 104 is given by $$\dot{q} = \rho c \kappa_e A_o (T_h - T_c)/L, \tag{3}$$

where $\rho$ is the fluid density, c its specific heat and $\kappa_e$ the effective thermal diffusivity from Equation (1). The largest heat flux measured here was $q/A_o = 70$ cal/sec cm² = 2920 kw/m². This value is about twenty-seven times that obtained for copper at the same temperature gradient of 2.8° C./cm and is comparable with that achievable with heat pipes, even though the experimental heat transfer fluid was only water, rather than the preferred liquid metal, which has a much higher thermal conductivity and the duct walls were glass, rather than metal.

Analysis

To interpret the above experimental results, we next develop an approximate theory for the observed phenomenon. We consider the Navier Stokes equation and the corresponding heat conduction equation for radially and time dependent flow in a very long pipe of inner radius r=a and an infinitely thick wall. Both the fluid and the tube wall are allowed to have finite thermal conductivity with the thermal diffusivity and heat conductivity values given $\kappa_f, k_f$ and $\kappa_w, k_w$, respectively. For the high frequency oscillatory flows considered here, the radially dependent axial velocity profile under laminar conditions is simply (see H. Schlichting, *Boundary Layer Theory* McGraw-Hill, New York, 1968, page 419):

$$W(r,t) = W_o \left[ 1 - \frac{a}{r} \exp - \sqrt{i} \, \alpha \left( 1 - \frac{r}{a} \right) \right] \exp i\omega t = W_o f e^{i\omega t}, \quad (4)$$

where $\alpha = a\sqrt{\omega}/\nu$ and $W_o$ is the maximum velocity along the tube axis.

The real part of the result of Equation (4) is a time-dependent profile which represents a constant velocity core connected to thin Stoke's boundary layers of thickness $\delta = \sqrt{2\nu/\omega}$ at the tube wall.

To find the corresponding temperature distribution we assume that there is a time-averaged axial temperature gradient $\delta T/\delta z = \gamma$ existing both in the fluid and in the wall and that the instantaneous temperature distribution can assume the locally valid form $$T = \gamma[z + ag(r)e^{i\omega t}] \quad (5)$$

first proposed by Chatwin (P.C. Chatwin, *J. Fluid Mech.* Vol. 71, p. 513 (1975)). The function g(r) appearing in this expression is expected to have a non-vanishing value both within the fluid and within the wall in the immediate vicinity of the liquid-solid interface. Substituting Equation (5) into the heat conduction equation $$T_t + W(r,t)S(r-a)T_z = \kappa \left[ \frac{1}{r} \frac{\partial}{\partial r} \left( r \frac{\partial T}{\partial r} \right) + \frac{\partial^2 T}{\partial z^2} \right], \quad (6)$$

where $$S(r-a) = \begin{cases} 1, & 0 < r < a \\ 0, & a < r < \infty, \end{cases} \quad (7)$$

yields, after solving, the large $\alpha$ approximations $$g_f(\eta) = C_1[\exp - \sqrt{iPr} \, \eta] + \frac{i}{2}\left(\frac{\Delta z}{a}\right)[1 - \beta\exp - \sqrt{i} \, \eta] \quad (8)$$

within the fluid and $$g_w(\eta) = C_2\exp \sqrt{i\sigma Pr} \, \eta \quad (9)$$

within the wall. Here $\beta = Pr/(Pr-1)$, $\Delta z$ is the tidal displacement (equal to twice the cross-section averaged amplitude of the sinusoidal oscillation), $\sigma = \kappa_f/\kappa_w$, and $\eta = \alpha(1-r/a)$. In deriving these results use has been made of the boundary conditions that the derivative of $g_f$ vanishes at r=0 ($\eta = \infty$) and that $g_w$ is bounded as r becomes infinite. the constants $C_1$ and $C_2$ appearing in Equations (8) and (9) can be determined from the two interfacial conditions at $\eta = 0$ of $g_f(0) = g_w(0)$ and $k_f g_f'(0) = k_w g_w'(0)$. These two conditions correspond to a continuity of temperature and radial heat flux at the liquid solid interface and lead to the value $$C_1 = \frac{i}{2} \frac{\Delta z}{a} [\mu\beta - (1-\beta)\sqrt{\sigma Pr}]/[\sqrt{Pr} \, (\mu + \sqrt{\sigma})] = -\frac{i\Delta z h}{2a\sqrt{Pr}} \quad (10)$$

for the constant appearing in Equation (8). Here $\mu = k_f/k_w$. Note that for an insulating wall, the second interfacial condition becomes $g_f(0) = 0$ and would then be identical with the condition used in related contaminant diffusion problems. (See G. I. Taylor, *Proc. Roy. Soc. London Ser. A*, Vol. 22, page 446 (1945); P. C. Chatwin, *J. Fluid Mech.*, Vol. 71, page 513 (1975); and E. J. Watson, *J. Fluid Mech.*, Vol. 133, page 233 (1983)).

To determine the resultant effective axial heat transfer one can employ the multiple timescale approach for cases were $\alpha^2 Pr < \pi$ or a direct integration method valid for arbitrary oscillation frequencies. In the present case we use the later approach as we are dealing with high frequency oscillations in the sense that $\alpha^2 Pr > \pi$. Neglecting the minor contribution of axial conduction in the heat transfer process, it readily follows that the effective axial thermal diffusivity multiplied by the tube cross-sectional area and the time averaged axial temperature gradient should be equal to the axial thermal flux integrated over the tube cross-section. Mathematically this can be written as $$\kappa_e \pi a^2 \gamma = -2\pi \int_o^a \text{Real}[W(r,t)]\text{Real}[T(r,t)]rdr. \quad (11)$$

On substituting Equations (4) and (5) into this expression and time averaging over one cycle of the oscillation, the effective thermal diffusivity for large $\alpha^2 Pr$ is found to $$\kappa_e = -\frac{aW_o}{2\alpha} \int_o^\infty [\bar{f}g_f + f\bar{g}_f]d\eta, \quad (12)$$

where the bar superscript denotes the complex conjugate of the functions indicated. Next, using Equation (6) together with its complex conjugate to replace f and $\bar{f}$ in this last expression and integrating by parts, employing the boundary conditions at $\eta = 0$ (wall) and $\eta = \infty$ (axis), yields the effective thermal diffusivity $$\kappa_e = \alpha\kappa_f \left( \frac{1}{2}[g_f(0)\bar{g}_f'(0) + \bar{g}_f(0)g_f'(0)] + \int_o^\infty g_f'\bar{g}_f' d\eta \right). \quad (13)$$

An evaluation of this expression using the explicit form of $g_f$ given by Equation (8) yields, after some manipulations, the final result $$\kappa_e = F(Pr, \sigma, \mu)\Delta z^2 \sqrt{\omega\nu} \, /a, \quad (14)$$

where
-continued $$F(Pr,\sigma,h) = \frac{1}{4\sqrt{2}\ Pr}\left\{\beta + h + \beta h(1 + \sqrt{Pr}\ )\left[\frac{2}{(1+Pr)} - \frac{1}{\sqrt{Pr}}\right]\right\} \quad (15)$$

with Pr, $\beta$, and h as defined earlier.

Figure 4:
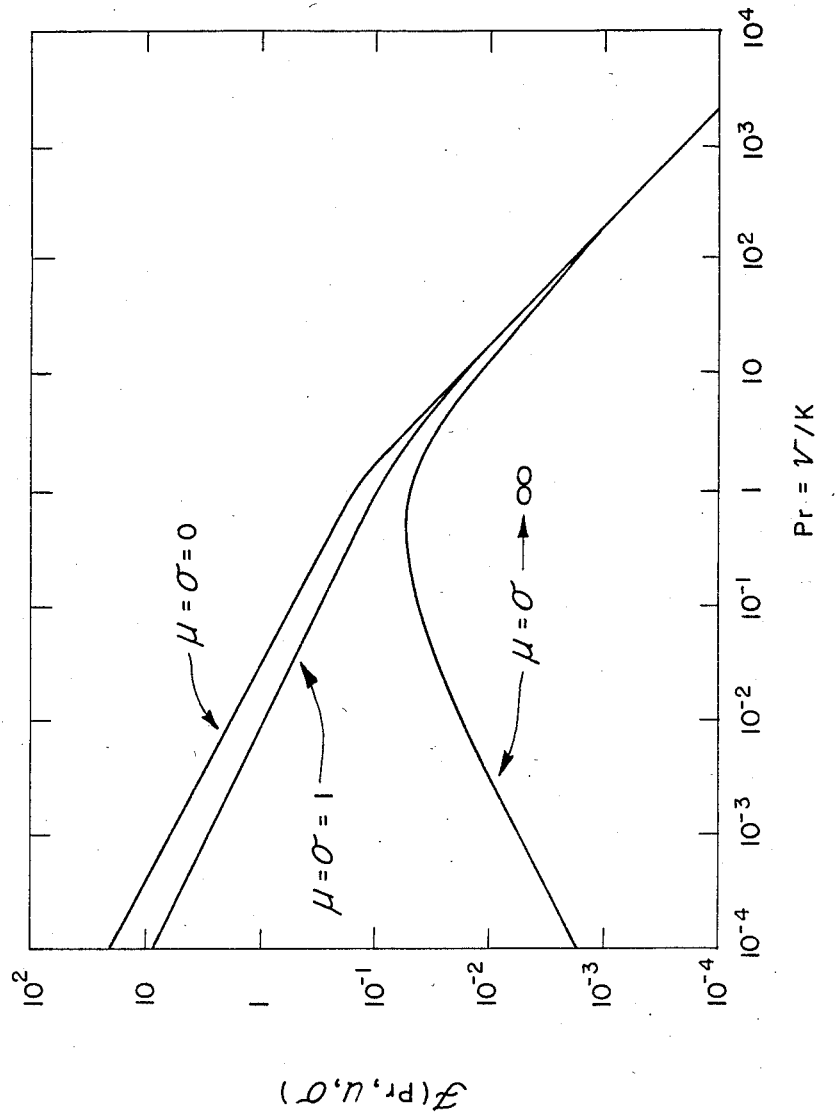
FIG. 4 is a plot depicting the effects of Prandtl number, wall conductivity, and fluid conductivity.

A plot of F as a function of Prandtl number is given in FIG. 4 for the three interesting cases of zero and infinite wall conductivity and for where the fluid and wall have equal values for $\mu$ and $\sigma$. Note that the largest values of $\kappa_e$ occur for small Pr fluids such as liquid metals and for walls which are good thermal conductors. At high Pr the value of varies only little with change in wall conductivity. For water at a mean temperature of 20° C. where Pr=6.9, the value of F is approximately $2 \times 10^{-2}$ when $\mu = \sigma = 1$. Equation (14) clearly shows that $\kappa_e$ is proportional to the square root of frequency, to the square of the tidal displacement and is inversely proportional to the tube radius.

Therefore, the largest axial heat transfer rates can be expected when the working fluid is a liquid metal, the tube is made of metal and has small radius and the frequency and tidal displacement are large. For example, oscillating liquid lithium within a metallic capillary bundle for which $a = 5 \times 10^{-2}$ cm at a frequency of 50 Hz with a displacement $\Delta z = 100$ cm, will yield, according to Equations (14) and (3), a heat flux of $0.6 \times 10^{10}$ watts/mt² if a 4° C./cm temperature gradient is maintained along the axis. This number is some two orders of magnitude larger than the best results achievable with liquid metal heat pipes.

Comparison With Experimental Results

Figure 3:
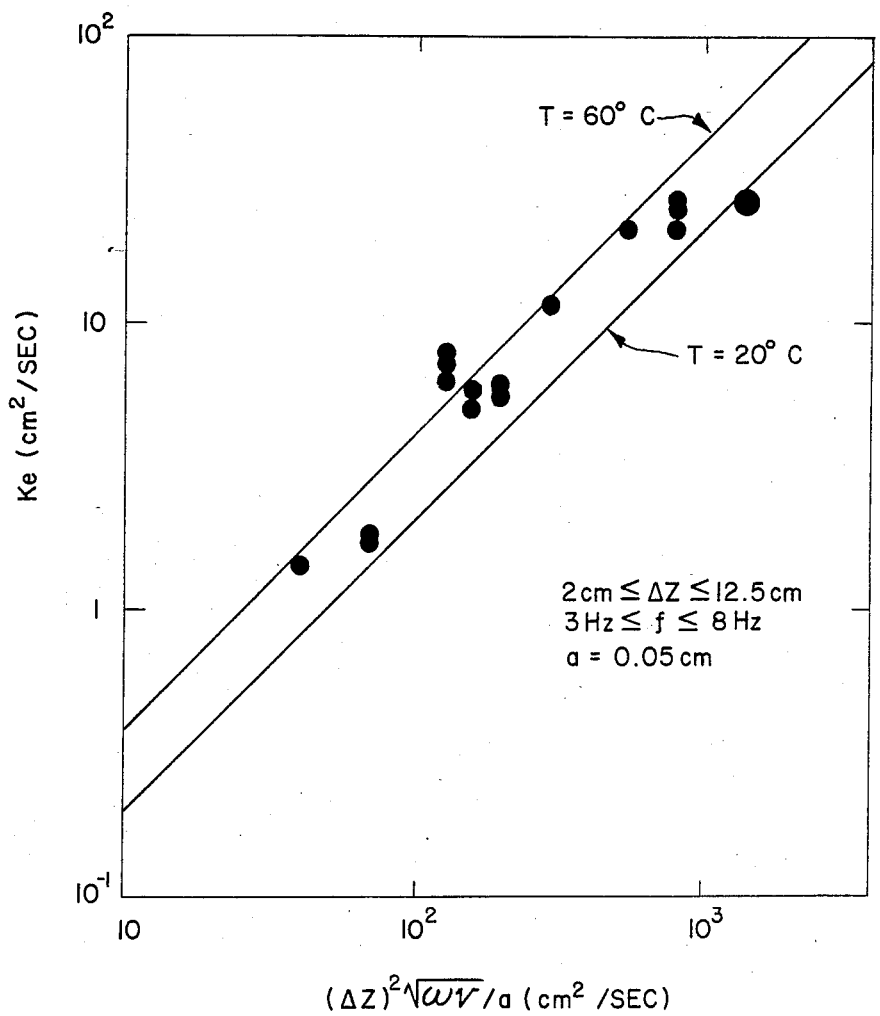
FIG. 3 is a plot of experimentally-observed thermal diffusivity as a function of tidal displacement and oscillation frequency at the highest and lowest temperatures encountered during the experiments.

A comparison of the analytical result represented by Equation (14) with the experimental observations shown in FIG. 3 can be made using the appropriate ratios and for a water-glass interface. These values are found to be $\sigma = 0.237$ and $\mu = 0.560$. Since the Prandtl number changes relatively rapidly with change in temperature, yet the theory assumes Pr to remain constant, the best comparison can be made by evaluating Equation (14) at several different temperatures falling between the highest and lowest temperatures encountered in the experiments. The results of such an evaluation for T=20° C. and T=60° C. (where Pr is 6.9 and 3.0, respectively) are recorded in FIG. 3 as solid lines. Such a comparison of an analytical result based on a single duct of infinite wall thickness with the experimental results involving glass capillaries of approximately 0.5 mm wall thickness is justified in the present high frequency limit since the radial variation in $g_w$ will have appreciable values for only a very short distance of $\sqrt{2\kappa_w/\omega}$ into the wall.

The agreement between theory and experiment is seen to be quite good. The results clearly support the initial assumption that one is dealing with a laminar axial conduction process in which the formation of very thin boundary layers leads to large radial heat flows which eventually manifest themselves by producing a very large axial flux. The observation that the axial heat transfer is proportional to the square of the tidal displacement and to the square root of frequency is confirmed.

Conclusion

In view of the foregoing, it will be appreciated that the present invention allows very large conduction heat transfers without a concomitant mass transfer. Using liquid metals as the heat transfer fluid it is estimated that heat fluxes will exceed $10^{10}$ watts/m² and hence produce heat transport at rates several orders of magnitude larger than the existing heat pipes, which at present are the best heat transport devices known. The heat transfer is accomplished through an enhanced conduction technique produced by oscillating the conducting fluid within a bundle of metallic tubes. No net mass transfer, such as occurs in convection processes, is involved and the method is thus ideally suited for the rapid removal of heat from radioactive fluids and certain chemical solutions which must remain isolated from the environment.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A heat transfer device comprising:
   a pair of fluid reservoirs adapted for positioning at respective locations of differing temperature between which it is desired to transfer heat;
   at least one duct connecting said fluid reservoirs and having walls of a material which conducts heat;
   a quantity of heat transfer fluid filling said duct and at least portions of said reservoirs; and
   means for establishing oscillatory axial movement of working fluid within said duct, the extent of fluid movement within said duct being less than the length of said duct.

2. A heat transfer device in accordance with claim 1, which comprises a plurality of ducts connecting said fluid reservoirs and having walls of a material which conducts heat.

3. A heat transfer device in accordance with claim 1, wherein said fluid is a liquid.

4. A heat transfer device in accordance with claim 1, wherein said fluid is a liquid metal.

5. A heat transfer device in accordance with claim 1, wherein said means for establishing oscillatory axial movement establishes sinusoidal movement.

6. A heat transfer device in accordance with claim 1, wherein each of said reservoirs includes a heat exchanger for exchanging heat with the heat transfer fluid within the respective reservoir.

7. A heat transfer device in accordance with claim 2, wherein each of said reservoirs includes a heat exchanger for exchanging heat with the heat transfer fluid within the respective reservoir.

8. A heat transfer device comprising:
   a pair of fluid reservoirs adapted for positioning at respective locations of differing temperature between which it is desired to transfer heat;
   at least one duct connecting said fluid reservoirs and having walls of a material which conducts heat;
   a quantity of heat transfer fluid filling said duct and at least portions of said reservoirs; and an oscillatory displacement device acting on fluid within one of said reservoirs for causing working fluid to alternately move axially in opposite directions within said duct, the extent of fluid movement within said duct being less than the length of said duct.

9. A heat transfer device in accordance with claim 8, which comprises a plurality of ducts connecting said fluid reservoirs and having walls of a material which conducts heat.

10. A heat transfer device in accordance with claim 9, wherein said fluid is a liquid.

11. A heat transfer device in accordance with claim 9, wherein said fluid is a liquid.

12. A heat transfer device in accordance with claim 8, wherein said oscillating displacement device oscillates sinusoidally.

13. A heat transfer device in accordance with claim 9, wherein said oscillating displacement device oscillates sinusoidally.

14. A heat transfer device in accordance with claim 8, wherein said fluid is a liquid metal.

15. A heat transfer device in accordance with claim 9, wherein said fluid is a liquid metal.

16. A heat transfer device in accordance with claim 15, wherein said heat transfer fluid comprises liquid mercury.

17. A heat transfer device in accordance with claim 15, wherein said heat transfer fluid comprises liquid lithium.

18. A heat transfer device in accordance with claim 15, wherein said heat transfer fluid comprises liquid sodium.

19. A heat transfer device in accordance with claim 8, wherein said tube walls comprise stainless steel.

20. A heat transfer device in accordance with claim 9, wherein said tube walls comprise stainless steel.

21. A heat transfer device in accordance with claim 8, wherein each of said reservoirs includes a heat exchanger for exchanging heat with the heat transfer fluid within the respective reservoir.

22. A heat transfer device in accordance with claim 9, wherein each of said reservoirs includes a heat exchanger for exchanging heat with the heat transfer fluid within the respective reservoir.

23. A heat transfer device in accordance with claim 10, wherein:

heat transfer fluid fills substantially all space within said reservoirs and said tube; and which further comprises;

a displacement accommodating device acted on by fluid within the other one of said reservoir.

24. A heat transfer device in accordance with claim 23, wherein said displacement accommodating device comprises a passive resilient member.

25. A heat transfer device in accordance with claim 11, wherein:

heat transfer fluid fills substantially all space within said reservoirs and said tube; and which further comprises:

a displacement accommodating device acted on by fluid within the other one of said reservoir.

26. A heat transfer device in accordance with claim 25, wherein said displacement accommodating device comprises a passive resilient member.

* * * * *